A. H. F. PERL.
FASTENING DEVICE.
APPLICATION FILED JAN. 26, 1920.
1,382,849.
Patented June 28, 1921.
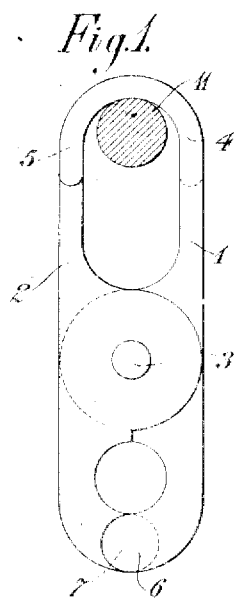
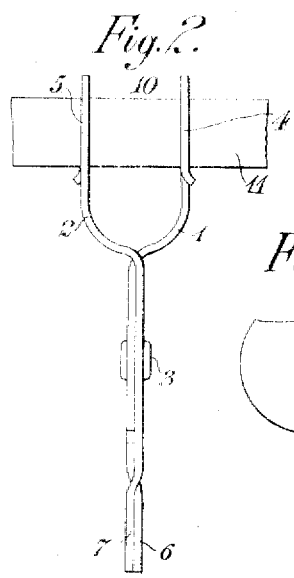
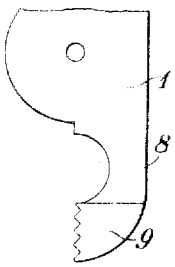
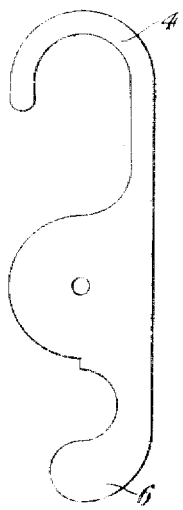
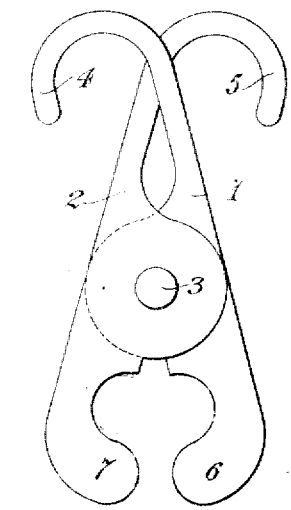
Inventor
A.H.F. Perl
by Jno. Lawrence
his Atty

UNITED STATES PATENT OFFICE.

ALBERT HENRY FRANKS PERL, OF CHISWICK, ENGLAND.

FASTENING DEVICE.

1,382,849.

Specification of Letters Patent. Patented June 28, 1921.

Application filed January 26, 1920. Serial No. 354,229.

(GRANTED UNDER THE PROVISIONS OF THE ACT OF MARCH 3, 1921, 41 STAT. L., 1313.)

*To all whom it may concern:*

Be it known that I, ALBERT HENRY FRANKS PERL, a subject of His Majesty the King of England, and resident of Chiswick, in the county of London, Kingdom of England, have invented certain new and useful Improvements in or Relating to Fastening Devices, for which I have filed application in Great Britain, January 31, 1919, No. 133,875, of which the following is a specification.

This invention relates to fastening devices or clips, more especially intended for use in suspending curtains and other hangings and has for its object to provide an improved construction of fastening device or clip hereinafter referred to as a clip, by which such curtains and other hangings can be more easily and quickly suspended.

According to the present invention the fastener or clip comprises a double hook, in the form of two members pivotally connected together at a point intermediate of their length and forming between them a hook at the one end which hook allows of the attachment or connection of the clip to a curtain rod or equivalent or to a ring thereon, the two hook portions thus formed being reversed relatively and arranged in parallel planes with a space between the said hook portions, with a gripping or part gripping or fastening portion at the other end of each member.

In order that the invention may be clearly understood reference is made to the accompanying drawings, whereon:—

Figure 1 is an elevation of a fastener or clip in accordance with the present invention.

Fig. 2 is a side view of Fig. 1.

Fig. 3 is a plan of Fig. 1.

Fig. 4 is a side view of one of the members of the fastener or clip, shown separately.

Fig. 5 is an elevation showing the clip or fastener in the open position, and

Figs. 6 and 7 are detail views hereinafter described.

The fastener or clip shown in Figs. 1, 2 and 3 comprises two members 1, 2, which are crossed or cross over each other and are pivotally connected at 3, each member being provided with a hook part 4, 5. The gripping jaws 6, 7 of the pivoted members 1, 2, are preferably disposed centrally between the hook parts 4, 5, the two members recrossing beyond the pivot pin 3, so as to overlap each other. The hook part 4 and the gripping jaw 6 of the member 1 are turned in the same direction but lie in different planes, as also the hook part 5 and the gripping jaw 7 of the member 2. The gripping portions 6, 7, may be arranged in alinement in the same plane so as to abut fairly against each other and may be provided with serrated edges.

Each pivoted member 1, 2, of the fastener or clip may be stamped or otherwise suitably formed from a strip of sheet metal or sheet metal blank such for example as brass, steel, aluminium, tin or other desired metal, the stamped form of one member, viz:—the right hand member, being shown in Fig. 4, or if so desired the fastener or clip may be made of celluloid, ebony, ivory, wood or other suitable material.

The gripping part of each pivoted member may be of any suitable form and may be provided by doubling over the sheet metal 8 on itself as at 9 and subsequently shaping the part so produced to the desired form of gripper, as shown more particularly in elevation and side view respectively in Figs. 6 and 7. If so desired each gripping part may be adjustably carried on its respective pivoted member. The space 10 between the two parallel planes containing the hook parts 4, 5, is of sufficient width to allow of its being passed over a curtain rod 11 or equivalent or a ring or other suitable retaining device after which the clip is turned through an angle of approximately 90° and engaged with the curtain rod, or equivalent, or a ring thereon. The action of the weight of the curtain, or any pulling action on the fastener or clip, causes the gripping jaws of the clip to engage tightly the curtain or other hanging which has been previously placed between the jaws for that purpose and results in practically locking the gripping jaws on the article gripped. It is obvious that by using the clip in this manner, the rings usually employed for suspending curtains and the like, may be dispensed with and the clip attached direct to the rod or to a wire or equivalent fastened across the window.

What I claim is:—

1. A fastening device comprising pivotally connected members formed at one end with spaced suspending elements and formed at the opposite end with contacting elements to together provide a gripping means.

2. A fastening device comprising pivotally connected members each formed at one end with a suspending element and at the opposite end with a gripping member, the suspending elements being in relatively spaced relation and the gripping members operating in contact, the suspending members and gripping members being arranged in parallel planes.

3. A fastening device comprising pivotally connected members each formed at one end with a hook and at the opposite end with a gripping element, the hooks being arranged in spaced parallel relation and the gripping elements adapted for contact.

4. A fastening device comprising pivotally connected members each formed at one end with a hook and at the opposite end with a gripping element, the hooks of the respective members being in relatively reverse hook relation and spaced apart, the gripping elements being arranged for contact.

5. A fastening device comprising pivotally connected members each formed at one end with a hook and at the opposite end with a gripping element, the hooks of the respective members being in relatively reverse hook relation and spaced apart, the gripping elements being arranged for contact, in a plane parallel to and intermediate the hooks.

6. A fastening device comprising pivotally connected members having coöperating gripping elements formed at one end and movable toward each other and into contact for gripping operations, the opposite end of each member being formed with a hook opening in the direction of movement of the gripping element of such member for gripping action, whereby the hooks are reversed in a line axially of the members when the gripping elements are in gripping coöperation.

In testimony whereof I have hereunto signed my name.

ALBERT HENRY FRANKS PERL.